United States Patent
Eyman et al.

(10) Patent No.: US 7,771,702 B2
(45) Date of Patent: Aug. 10, 2010

(54) SULFUR-TOLERANT CATALYSTS AND RELATED PRECURSORS AND PROCESSES

(75) Inventors: Darrell P. Eyman, Iowa City, IA (US); Christopher Brooks, Raymond, OH (US)

(73) Assignees: University of Iowa Research Foundation, Iowa City, IA (US); Honda Motor Co., Ltd., Tokyo (JP)

(*) Notice: Subject to any disclaimer, the term of this patent is extended or adjusted under 35 U.S.C. 154(b) by 2084 days.

(21) Appl. No.: 10/371,188

(22) Filed: Feb. 20, 2003

(65) Prior Publication Data

US 2004/0166056 A1 Aug. 26, 2004

(51) Int. Cl.
*C01B 3/26* (2006.01)
*B01J 23/10* (2006.01)
*B01J 23/22* (2006.01)
*B01J 23/42* (2006.01)
*B01J 23/44* (2006.01)
*B01J 23/46* (2006.01)
*B01J 23/755* (2006.01)

(52) U.S. Cl. .................. 423/652; 423/653; 423/654; 502/304; 502/308; 502/309; 502/324; 502/327; 502/332; 502/333; 502/334; 502/335; 502/355

(58) Field of Classification Search ................ 423/652, 423/653, 654; 502/304, 308, 309, 324, 327, 502/333, 334, 335, 332, 355
See application file for complete search history.

(56) References Cited

U.S. PATENT DOCUMENTS 3,791,993 A 2/1974 Rostrup-Nielson .......... 252/466
4,316,821 A * 2/1982 Bruckman ................ 502/350
4,432,863 A 2/1984 Myers et al. .............. 208/113
4,642,302 A * 2/1987 Wood et al. ............... 502/332

(Continued)

FOREIGN PATENT DOCUMENTS

WO WO-01/53196 A1 7/2001

(Continued)

OTHER PUBLICATIONS

Ashcroft, et al., *Nature*, 352, (1991),225.

(Continued)

*Primary Examiner*—Wayne Langel
(74) *Attorney, Agent, or Firm*—Viksnins Harris & Padys PLLP (57) ABSTRACT

The invention provides active, affordable, durable, and sulfur-tolerant catalysts and related precursors and processes useful in hydrogen production. The catalysts have a wide applicability. For example, in one embodiment, the invention provides sulfur-tolerant catalysts which, when used in a catalytic fuel processor, will facilitate sufficient hydrogen generation within 30 seconds or so of automobile start-up to generate around 50 kW of fuel cell power. Catalysts of the instant invention are made by reducing a catalyst precursor comprising a support phase impregnated with one or more elemental transition metals, wherein:
(a) the support phase is formed by dispersion of a monolayer on the surface of a high surface area alumina support; and
(b) the monolayer comprises $XO_nYO_2$, where (1) $XO_n$ is a redox active metal oxide and n is either 1.5, 2, or 2.5 depending on the oxidation number of X, and (2) $YO_2$ is a redox inactive metal oxide.

$Ni$—$V_2O_5$—$ZrO_2/Al_2O_3$ catalysts of the instant invention are preferred.

85 Claims, 2 Drawing Sheets

U.S. PATENT DOCUMENTS

| | | | | |
|---|---|---|---|---|
| 4,748,145 | A | * | 5/1988 | Wood et al. .................. 502/332 |
| 4,906,448 | A | | 3/1990 | Sauvion et al. ............. 423/437 |
| 5,047,379 | A | * | 9/1991 | Alyea et al. ................... 502/79 |
| 5,939,353 | A | | 8/1999 | Bhattacharyya et al. ..... 502/524 |
| 6,162,267 | A | | 12/2000 | Priegnitz et al. .............. 48/199 |
| 6,245,708 | B1 | * | 6/2001 | Wachs et al. ................ 502/305 |

FOREIGN PATENT DOCUMENTS

WO      WO-01/76736 A1      10/2001

OTHER PUBLICATIONS

Gampine, et al., "Catalytic Hydrodechlorination of Chlorocarbons.2. Ternary Oxide Supports for Catalytic Conversions of 1,2-Dichlorobenzene", *J. Cat.*, 179, (1998),315.

Heck, R M., et al., "Catalytic Air Pollution Control", *Cat. Lett.*, 74, Commercial Technology, 2nd Edition, John Wiley and Roh et al.,(2001),31.

Putna, et al., *Cat. Today*, 50, (1999),343.

Roozeboom, et al., *J. Phys. Chem*, 84, (1980),2783-2791.

Wachs, Israel E., "Structure and reactivity of surface vanadiuim oxide species on oxide supports", *Applied Catalysis A: General*, vol. 157,(1997),67-90.

Xie, Youchang , "An important principle for catalyst preparation—spontaneous monolayer dispersion of solid compounds onto surfaces of supports", *In Preparation of Catalysts VII*, B. Delmon et al., editors, Copyright 1998 Elsevier Science B.V.,(1998),441-449.

* cited by examiner

SULFUR-TOLERANT CATALYSTS AND RELATED PRECURSORS AND PROCESSES

FIELD OF THE INVENTION

The invention provides active, affordable, durable, and sulfur-tolerant catalysts and related precursors and processes useful in hydrogen production. The catalysts have a wide applicability. For example, in one embodiment, the invention provides sulfur-tolerant catalysts which, when used in a catalytic fuel processor, will facilitate sufficient hydrogen generation within a short period after automobile start-up to generate a relatively substantial amount of fuel cell power. Catalysts of the instant invention are made by reducing a catalyst precursor comprising a support phase impregnated with one or more elemental transition metals, wherein:
(a) the support phase is formed by dispersion of a monolayer on the surface of a high surface area alumina support; and
(b) the monolayer comprises $XO_nYO_2$, where (1) $XO_n$ is a redox active metal oxide and n is either 1.5, 2, 2.5, or 3 depending on the oxidation number of X, and (2) $YO_2$ is a redox inactive metal oxide.

BACKGROUND OF THE INVENTION

Fuel cells convert the chemical energy in fuels such as alcohols and hydrocarbons into usable electricity at efficiencies higher than those obtained by conventional thermal combustion. Such conversion is accomplished without production of pollutants such as $SO_n$, $NO_n$, and carbon soot. Since fuel cells operate at optimal efficiencies when $H_2$ is used as a fuel, there is currently a worldwide effort to develop and refine means of generating hydrogen from conventional fuels. These efforts include developing on-board automobile catalytic fuel processors that will generate hydrogen from gasoline or diesel fuel in a manner compatible with existing vehicle fuel distribution networks.

Conventionally, $H_2$ is produced in the chemical industry (for the manufacture of $NH_3$ or methanol, for example) from hydrocarbons by way of a four-stage process. First, hydrocarbon feedstock is hydrodesulfurized to less than 0.5 ppm of S using sulfided CoMo or NiMo catalysts and a ZnO. Second, the feedstock is subjected to steam reforming with excess steam at 800-1000° C. pursuant to the following (highly endothermic) reaction:

$$CH_4+H_2O \rightarrow CO+3H_2$$

that uses Ni catalysts supported on alumina, magnesia, silica, or calcium aluminate. The $H_2$ and CO product of this reaction is referred to as synthesis gas. Next, the CO generated in steam reformation is subjected to a two-step, exothermic water gas shift reaction at 200-450° C. pursuant to the following reaction:

$$CO+H_2O \rightarrow CO_2+H_2$$

that utilizes a high temperature shift reaction employing Fe-based catalysts and a low temperature shift reaction on Cu—ZnO catalysts. Finally, the CO content of the steam reforming reaction effluent is reduced to about 1 ppm by methanation according to the following reaction:

$$CO+3H_2 \rightarrow CH_4+H_2O$$

using nickel-based catalysts or by partial oxidation ($CO+0.5O_2 \rightarrow CO_2$) using Pt-based catalysts such as Pt—$CeO_2$.

Alternatively, exothermic partial oxidation of alkanes or other hydrocarbon-containing feedstocks can be used to generate $H_2$ in a much lower ratio of $H_2$ to CO. Partial oxidation occurs pursuant to the following reaction, using methane as a feedstock example:

$$CH_4+0.5O_2 \rightarrow 2H_2+CO$$

$$CO+0.5O_2 \rightarrow CO_2$$

The most active catalysts for steam reforming or partial oxidation of hydrocarbons usually contain nickel. However, conventional steam reforming or partial oxidation catalysts based on Ni (such as Ni—$Al_2O_3$, Ni—MgO, Ni—Ca—$Al_2O_4$, Ni—$SiO_2$ etc) lack sufficient activity for conversion of CO to $CO_2$. Although nickel on alumina catalysts are effective for the conversion of methane to synthesis gas using molecular oxygen, such a catalyst, as well as commercial nickel-containing steam reforming, steam cracking, and partial oxidation catalysts, form coke and deactivate relatively rapidly. While transition metal catalysts, such as ruthenium on alumina, can be used to reform a hydrocarbyl compound in the presence of molecular oxygen, such transition metals are expensive.

One disadvantage of known catalysts and processes for the generation of hydrogen is that the hydrocarbon or alcohol feedstock that is used must be desulfurized to a level of less than 0.5 ppm of sulfur-containing compounds. This is because in the presence of such compounds, prior art catalysts undergo severe deactivation leading to drastic reduction in their productivity, selectivity and durability. The desulfurization of hydrocarbon feedstocks to a level of below 0.5 ppm of sulfur compounds prior to their use in hydrogen production processes such as steam reforming, autothermal reforming, water gas shift reaction and partial oxidation is expensive and increases the cost of the hydrogen generated by such processes.

Thus, there is a significant interest in improving the efficiencies and yields of processes that generate hydrogen, for example by reforming hydrocarbon feedstocks such as gasoline, diesel fuel, natural gas, or other fuel sources such as alcohol. Economically improving such efficiencies and yields calls for an affordable, durable, sulfur-tolerant, coke-resistant, highly active, and selective hydrogen generation catalyst. In particular, fuel cells require active, multi-functional catalysts that (1) can operate at lower temperatures; (2) facilitate the aforementioned hydrogen generation reactions; and (3) enable a more compact fuel processor design.

To meet the power needs of hydrogen-oxygen fuel cells, a hydrogen generation catalyst employed in a fuel processor must be able to generate $H_2$ from a hydrocarbon fuel containing typical quantities of sulfur compounds at acceptable rates and operating temperatures. Ideally, the catalyst must perform over extended periods of time and in a relatively short start-up time. The activity of the preferred catalyst must be such that it generates a gas sufficiently rich in hydrogen in a relatively small fuel processor. Among numerous potential applications of this catalyst, a current automotive design objective is the production, within 30 seconds of start-up, of 50 kW of fuel cell power derived from a 7 liter fuel processor. The fuel processor could be an integral packed bed catalytic reactor capable of generating, within the aforementioned start-up times, $H_2$ in sufficient yields, and at acceptable temperatures, to meet vehicular power requirements.

In designing a fuel processor for generation of hydrogen, the effect of catalyst type and configuration on steam reforming or partial oxidation reactor design and performance must be considered. Variation in catalyst type, volumetric density, and dispersion within a reactor bed can lead to increased pressure drop.

Ashcroft et al., *Nature*, Volume 352, page 225, (1991), describes the reforming of methane with carbon dioxide to form synthesis gas, a mixture of CO and hydrogen, using catalysts such as palladium, ruthenium and iridium on alumina, as well as nickel on alumina.

In U.S. Pat. No. 3,791,993, catalysts containing nickel for reforming gaseous or vaporizable liquid hydrocarbons using steam, carbon oxide, oxygen and/or air were prepared by coprecipitating a nickel salt, a magnesium salt and an aluminate to form a sludge. The sludge was then washed until substantially free of sodium and potassium, dried, and dehydrated at 300° C. to 750° C. The ultimate catalyst was formed after calcination at 850° C. to 1100° C. Examples show that compositions having a 1:1:2 or a 2:7:1 mole ratio of nickel, magnesium and aluminum, respectively, are suitable for converting naphtha to hydrogen-rich gaseous products using steam reforming.

U.S. Pat. No. 6,162,267 discloses steam reforming catalysts that include nickel with amounts of noble metal, such as cobalt, platinum, palladium, rhodium, ruthenium, iridium, and a support such as magnesia, magnesium aluminate, alumina, silica, zirconia, singly or in combination. These catalysts can be a single metal such as nickel or a noble metal supported on a refractory carrier such as magnesia, magnesium aluminate, alumina, silica, or zirconia, singly or in combination, promoted by an alkali metal such as potassium. Nickel supported on alumina and promoted by an alkali metal such as potassium is preferred.

Redox active transition metal oxides are well known as components of commercial catalysts. Such oxides are typically incorporated by impregnation on a support or co-precipitation to form a bulk catalyst. Examples are found in *Catalytic Air Pollution Control, Commercial Technology*, 2$^{nd}$ Ed. 2002, R. M. Heck and R. J. Farrauto, John Wiley and Roh et al., *Cat.Lett.*, Vol. 74, p. 31, 2001.

An example of a catalyst with a single component "two-dimensional" redox active metal oxide monolayer has been reported by Putna et al., *Cat. Today*, Vol. 50, p. 343, 1999. An example of a two-component, monolayer of metal oxide has been reported by Gampine et al., *J Cat.*, Vol. 179, p. 315, 1998 ("Gampine"). Gampine does not disclose catalysts comprising both a redox inactive and a redox active component within a monolayer of metal oxide and does not disclose a monolayer comprised of a redox inactive and a redox active metal oxide as a component of an active catalyst phase. The $TiO_2$ and $ZrO_2$ used in the monolayer employed in Gampine's catalysts are both redox inactive metal oxides.

OBJECTS OF THE INVENTION

It is an object of the instant invention to provide improved catalysts and related precursors for use in generating hydrogen, for example by steam reforming.

It is an additional object of the instant invention to provide improved catalysts which are affordable, durable, sulfur-tolerant, coke-resistant, highly active, and selective.

It is an additional object of the instant invention to provide improved catalysts which, when used in steam reforming, can operate at lower temperatures and enable a more compact processor design.

It is an additional object of the instant invention to provide improved catalysts which meet the power needs of hydrogen-oxygen fuel cell powered units of various types by generating, at acceptable rates and operating temperatures, $H_2$ from various fuels including alcohol and hydrocarbon fuels containing typical quantities of sulfur compounds.

It is a further object of the instant invention to provide improved catalysts which, when used in steam reforming, perform over extended periods of time, have a relatively short start-up time and which generate a gas sufficiently rich in hydrogen using a relatively small catalyst volume.

SUMMARY OF THE INVENTION

In accordance with the above-stated objects, the present invention provides active, affordable, and durable catalysts and related precursors useful in the production of hydrogen by steam reforming even in the presence of significant quantities of sulfur and aromatic compounds. Catalysts of the instant invention are made by reducing a catalyst precursor comprising a support phase impregnated with one or more elemental transition metals, wherein:

(a) the support phase is formed by dispersion of a monolayer on the surface of a high surface area alumina support; and (b) the monolayer comprises $XO_nYO_2$, where (1) $XO_n$ is a redox active metal oxide and n is either 1.5, 2, 2.5, or 3 depending on the oxidation number of X, and (2) $YO_2$ is a redox inactive metal oxide.

Catalyst precursors of the instant invention include precursors of the formula $M-XO_n—YO_2/Al_2O_3$, wherein:

(a) M is an elemental reduced transition metal or mixture of elemental reduced transition metals including one or more of Ni, Pd, Pt, Rh, and Ru;

(b) $XO_n$ is a redox-active metal oxide such as $Mn_2O_3$, $V_2O_5$, and $CeO_2$; and (c) $YO_2$ is a redox-inactive metal oxide such as $TiO_2$ and $ZrO_2$.

Representative catalysts of the instant invention include $M-V_2O_5—ZrO_2/Al_2O_3$, where M is an elemental reduced transition metal or mixture of reduced transition metals including Ni, Pt, Pd, Rh and Ru. The instant invention also includes, for example, $Ni—Y—V_2O_5—ZrO_2/Al_2O_3$ catalysts, where Y is an elemental reduced transition metal or mixture of elemental reduced transition metals including Pd, Pt, Rh or Ru. $Ni—V_2O_5—ZrO_2/Al_2O_3$ catalysts are preferred.

In a particularly preferred embodiment, catalysts and related precursors of the instant invention comprises around 10% by weight Ni and oxides of V and Zr wherein the molar ratio of V:Zr is from about 1:2 to about 1:3 and the Zr has been obtained from zirconium n-butoxide. As another example, a catalyst of the instant invention comprising 5% by weight Ru as the sole transition metal has utility in steam reforming reactions. Catalysts and related precursors of the instant invention comprised of approximately 1% or more of palladium (Pd), platinum (Pt), or rhodium (Rh) as the sole transition metal are also within the scope of the instant invention.

The invention also provides methods of making catalysts of the instant invention by reducing related precursors through contact with a (1) hydrocarbon feed in situ in a reactor (2) hydrogen gas-rich stream at a temperature of between about 300° C. to around 600° C. (3) helium gas-rich stream at a temperature of between about 400° C. to around 800° C., or (4) CO gas-rich stream at a temperature of between about 400° C. to around 800° C.

The invention also provides processes for the generation of hydrogen using the aforementioned catalysts and related precursors wherein hydrocarbons and steam are reacted under hydrogen-forming conditions in the presence of the catalysts or precursors. Catalysts of the instant invention are highly selective to hydrogen, have high productivity and durability, and generate hydrogen from hydrocarbon mixtures containing significant quantities of sulfur compounds. From an economic point of view, catalysts of the instant invention that include nickel are very attractive because they are less expensive than noble metal catalysts.

In one embodiment, catalysts of the instant invention are used in steam reforming of fuels including natural gas, gasoline, propane, diesel fuel or methanol. During steam reforming, catalysts of the instant invention produce a suitably high percentage yield of hydrogen to make them useful steam reforming catalysts. These catalysts, and processes of the instant invention employing such processes, are also useful in other applications, including ammonia and methanol production, that require a high hydrogen yield and full hydrocarbon conversion under typical reaction conditions.

Where Pt, Pd or Rh are used as the sole transition metal in a catalyst or related precursor of the instant invention, such metal is preferably present in the catalyst or related precursor in an amount in excess of about 1% by weight. A catalyst of the instant invention containing around 5% Ru as the sole transition metal has been shown to perform satisfactorily in steam reforming reactions. In a steam reforming reaction using $Ru-V_2O_5-ZrO_2/Al_2O_3$ catalysts of the instant invention (comprising around 5% by weight elemental Ru) at 750° C., a steam to carbon ratio of around 2.5 and about 0.375 g of catalyst, the following approximate product composition was obtained (mole percent): $H_2$ equals 66%, CO equals 11%, $CO_2$ equals 15%, and $CH_4$ equals 8%.

Catalysts of the instant invention facilitate hydrogen generation, for example by steam reforming of hydrocarbons or other suitable fuel sources at low water to carbon ratios, relatively low temperatures, and with minimal formation of $C_2$ or higher hydrocarbons or coke. The hydrocarbon or alcohol fuel source may, optionally, also contain sulfur compounds in concentrations similar to those found in conventional transportation fuels like gasoline and diesel. A catalyst composition of the instant invention containing only about 10% elemental nickel and the oxides of vanadium and zirconium is preferred as it displayed the highest activity and the greatest stability with time. The performance of this particular catalyst has proven superior to other catalysts of the instant invention that have been tested.

$Ni-V_2O_5-ZrO_2/Al_2O_3$ catalysts of the instant invention have been used in the steam reforming of isooctane having 20 ppm sulfur, as well as a sample of gasoline containing 33 ppm of sulfur (California fuel). A hydrogen-rich product may also be generated by reacting catalysts of the instant invention in the presence of fuels such as methane, natural gas, liquefied petroleum gas, naphtha, propane, gasoline, kerosene, jet fuel, diesel or mixtures of these, and methanol.

The catalysts of the instant invention have proven stable even in the presence of sulfur compounds. In addition, the $CO/CO_2$ molar ratio obtained in steam reforming using $Ni-V_2O_5-ZrO_2/Al_2O_3$ catalysts of the instant invention is less than around 1.5, unlike the higher and less desirable ratios obtained with conventional steam reforming catalysts. Without any intention to limit the scope of the instant invention, hydrogen spillover, its reverse, and strong metal support interaction (SMSI) are believed to contribute to the performance of the catalysts of the instant invention. The vanadia-zirconia layer is thought to partially cover the acidic sites of the support (alumina) and thus impede coke formation. Sulfur is, perhaps, eliminated as $SO_2$ by the O atoms originating from $H_2O$ adsorption/dissociation on $V_2O_5-ZrO_2$. Again, these mechanistic postulates have no bearing on the scope of the instant invention In another aspect of the claimed invention, $Ni-V_2O_5-ZrO_2/Al_2O_3$ catalysts were dispersed in an integral packed bed reactor in a volumetric ratio of about 1:2 with silicon carbide to achieve total conversion of isooctane at reactor fuel space velocities as high as 80 g/g-catalyst-hour (g cat.hr).

The invention also provides a catalyst precursor or a catalyst prepared according to a process as described herein.

The invention is illustrated further in the following detailed description

DETAILED DESCRIPTION OF THE INVENTION

As used herein, the following notation and terms have the following respective meanings:

Catalyst and precursor composition notation: the composition of a catalyst is described herein using the format $M_1-M_2-M_3/Al_2O_3$, where "/" indicates that all materials to the left are supported on $Al_2O_3$ and "-" separates the identities of the supported materials.

"Catalyst threshold limits" refers to the maximum fuel space velocity (g fuel/g cat.hr), that can be achieved while maintaining almost complete fuel conversion and without forming significant amounts of higher hydrocarbons ($C_2$ and above) and coke.

"Cold start operation" means the startup test conditions that involve rapid heating of the catalyst to the operating temperature followed by initiation of fuel and water flow.

"Formula-unit" means the smallest number of atoms that represent the composition of a compound.

"Fuel-space velocity" means grams of fuel passed per gram of catalyst per hour.

"Hydrocarbon feed" means a feedstock comprising compositions that may be used as fuels, e.g., a composition that can be steam-reformed to generate hydrogen. Examples of fuels include straight and branched alkyls such as methane, propane, isooctane; aromatic hydrocarbons such as toluene; oxygenated hydrocarbons including alcohols such as methanol and ethanol, ethers such as dimethyl ether and methyl tertbutyl ether, and glycols such as ethylene glycol; and hydrocarbon mixtures such as gasoline, kerosene, and diesel.

"Precursor" means a composition or compositions that can be converted through a controlled process to a final desired form, including for example a desired oxidation state. For example, "catalyst precursors" as used herein means compositions which, upon reduction through methods disclosed hereinafter, are converted to a catalytically-active form through a change in oxidation state.

"Impregnation" means transfer of a composition onto a surface, usually through dissolving a solution of the composition onto the surface. "Co-impregnation" means impregnation of a surface with a solution that contains two or more solutes.

"Monolayer" means a one formula unit-thick ("two-dimensional") layer, e.g., of metal oxide, deposited (i.e., dispersed) on a surface. For example, a two-component monolayer of redox active and redox inactive metal oxides is deposited onto a high surface-area alumina support to form a catalyst and related precursor support phase. Monolayer formation was established in the case of $VO_x$—$ZrO_2$ embodiments of the instant invention based on a combination of analyses including elemental analysis, surface area measurements, thermogravimetric measurements, and the absence of any lines characteristic of crystalline $V_2O_5$, $VO_2$, $V_2O_3$, or $ZrO_2$ in the x-ray powder diffraction patterns of newly prepared and used samples of $VO_x$—$ZrO_2$/$Al_2O_3$ based catalysts. This technique is an accepted means of establishing the monolayer or "two-dimensional" nature of deposited metal oxide (Roozeboom, et al., *J Phys. Chem.* 84, 2783-2791, 1980). A monolayer need not be continuous across the surface.

"Alkoxides" are compounds formed by the reaction of an alcohol and an alkali metal and have the formula A-OR, where A is the alkali metal and where R can be for example a $C_1$ to $C_{20}$ straight or branched chain alkyl, preferably a $C_1$ to $C_6$ alkyl. Alkoxides used in making the catalysts and related precursors of the instant invention include vanadium isopropoxide, zirconium isopropoxide, zirconium n-butoxide, and cenium isopropoxide. In the instant invention, alkoxides can be (but need not necessarily be) the source of the redox active metal oxide (in the case, e.g., of vanadium isopropoxide) and redox inactive metal oxide (in the case, e.g., of zirconium isopropoxide and zirconium n-butoxide) comprising the monolayer deposited onto the high surface area alumina support to form a catalyst and related precursor support phase.

A "redox active metal oxide" undergoes reduction and oxidation under steam reforming conditions described hereinafter. Redox active metal oxides include, but are not limited to, manganese (III) oxide ($Mn_2O_3$), vanadium(V) oxide ($V_2O_5$), cerium(IV) oxide ($CeO_2$), molybdenum(VI) oxide ($MoO_3$), and oxides of the lanthanides such as praseodymium (Pr), neodymium (Nd), gadolinium (Gd), and cerium (Ce).

A "redox-inactive metal oxide" is chemically inert under steam reforming conditions described hereinafter. Redox inactive metal oxides include, but are not limited to, $ZrO_2$ and $TiO_2$.

The "impregnation solution" refers to a solution of the alkoxides used to impregnate alumina in the catalyst preparation producing the redox active metal oxide and the redox inactive metal oxide. This solution can contain different ratios of the alkoxides but this ratio does not define the actual ratio of the metals in the two dimensional film of the prepared catalyst.

"Skin temperature" and "quartz reactor wall temperature" mean the temperature of the outside of the quartz reactor wall.

"Sulfur-tolerant" when used herein to describe a catalyst means that the catalyst does not loose its effectiveness as the result of chemical interaction with sulfur-containing compounds in a hydrocarbon feed.

"Transition metals" (referred to herein on occasion as "M") include but are not limited to nickel (Ni), palladium (Pd), platinum (Pt), ruthenium (Ru) and rhodium (Rh). "Elemental transition metals" means transition metals that exist in the 0 oxidation state.

"Impregnable metallic solution" as used herein means soluble compositions comprising transition metal compounds dissolved in a solvent. The transition metal compound dissolved in the impregnable metal solvent is converted to its elemental state by solvent removal followed by reduction with hydrogen. Dissolution of the impregnable metallic compound in a solvent followed by addition to the alumina supported two-component monolayer of redox active and redox inactive metal oxide deposits the elemental transition metal compound onto the monolayer. Impregnable metallic compound solvents comprise solvents such as water, tetrahydrofuran, diethyl ether, toluene, and dimethylsulfoxide. More than one transition metal compound dissolved in a solvent is used to impregnate the support in sequential operations to impregnate transition metal mixtures.

"Steam reforming" is a chemical reaction in which a fuel reacts with water to generate hydrogen and carbon oxides. Steam reforming reactions have been described above and examples of such reactions are provided hereinafter.

Catalyst precursors of the instant invention are made by impregnating a support phase with one or more elemental transition metals, wherein:
(a) the support phase is formed by dispersion of a monolayer on the surface of a high surface area alumina support; and
(b) the monolayer comprises $XO_nYO_2$, where (1) $XO_n$ is a redox active metal oxide and n is either 1.5, 2, 2.5, or 3 depending on the oxidation number of X, and (2) $YO_2$ is a redox inactive metal oxide.

Thus, the invention provides an article comprising one or more transition metals impregnated in a support phase that comprises 1) a monolayer comprising $XO_nYO_2$, and 2) an alumina support, wherein $XO_n$ is a redox active metal oxide, n is 1.5, 2, 2.5, or 3 depending on the oxidation number of X, and $YO_2$ is a redox inactive metal oxide.

In a preferred embodiment, catalysts and related precursors of the instant invention are made as follows. A boiling solution of zirconium n-butoxide and vanadium isopropoxide is deposited onto a high surface area alumina support. The resulting material is processed to form a two-component monolayer of redox active $V_2O_5$ and redox inactive $ZrO_2$ on the alumina support. The processing entails removal of solvent by vacuum, followed by passage of water vapor for 24 hours, followed by calcining at 500° C. The resultant two-component monolayer film of redox active $V_2O_5$ and redox inactive $ZrO_2$ on the alumina support is called the support phase. Ni is impregnated into the support having a monolayer film through dissolution of an impregnable metal compound solution comprising $NiNO_3.6H_2O$ dissolved in THF and acidified with $HNO_3$ (pH=0.2 to 0.4) to complete formation of the catalyst precursor. The precursor is then reduced by one or more of the methods described previously to complete formation of the active, sulfur-tolerant catalyst. The ratio of V to Zr in the solution used to impregnate alumina ranges from approximately 2:1 to approximately 1:15 on a molar basis; a value of around 1:4 is particularly preferred. These preferred catalysts and related precursors can have (1) a surface area of about 200 to 250 $m^2$ (2) a pore volume of about 0.50 to 0.75 $cm^3$ per gram, and (3) an average pore diameter of about 6 to 9 nanometers. Typically, the alumina support is in the form of a spherically-shaped granule. These preferred characteristics and values are discussed further hereinafter.

Catalyst formulations of the instant invention were varied to achieve different mole ratios of V:Zr in the two component monolayer of redox active and redox inactive metal oxides.

Figure 2:
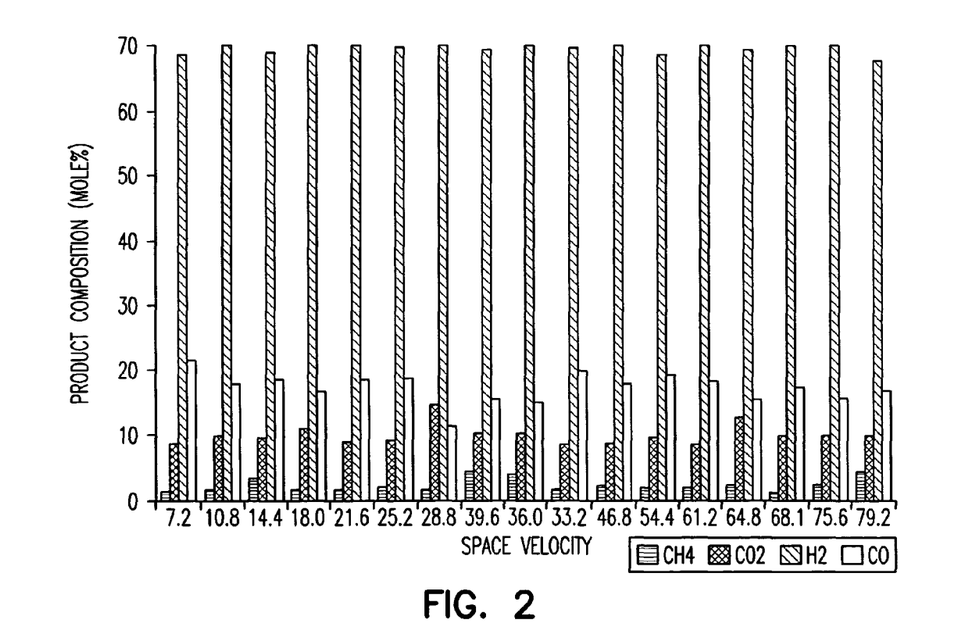
FIG. 2 depicts a plot of steam reforming reaction product composition in which a 10% $Ni-VO_n-ZrO_2/Al_2O_3$ catalyst of the instant invention is used during reforming at different space velocities of the fuel (V:Zr impregnation solution ratio in the catalyst equals 1:4; steam to carbon ratio is 2.5:1 and the oven temperature is 750° C.).

This was accomplished by using impregnation solutions with V:Zr ratios of 2:1, 1:1, 1:2, 1:3, 1:4. However, the molar ratio of V:Zr in the impregnation solution can range from about 2:1 to around 1:15 or higher. The weight percentage of the preferred transition metal Ni was also varied between about 0%, 1%, 5%, 10% and 15% by weight of the total catalyst. As shown in FIG. 2, a catalyst comprising 10% nickel, prepared using an impregnation solution with a V:Zr molar ratio of of 1:4, which was made using zirconium n-butoxide, achieved complete conversion of isooctane during steam reforming without the formation of higher hydrocarbons or coke. Fuel space velocities of as high as 80 g fuel/g cat.hr were obtained at a water to carbon ratio of 2.5:1 and at a quartz reactor wall, or skin temperature, below 715° C. At the same fuel space velocity and a skin temperature of 670° C., small amounts of unconverted isooctane and higher hydrocarbons were detected, but these were present in an amount of 0.1% on a weight basis of total gas products. Importantly, these results were obtained during a cold start operation. That is, after passing air for around eight hours at temperatures up to 200° C., the catalyst was used at the indicated fuel-space velocity immediately after the steam-reforming reactor reached operating temperature.

Figure 1:
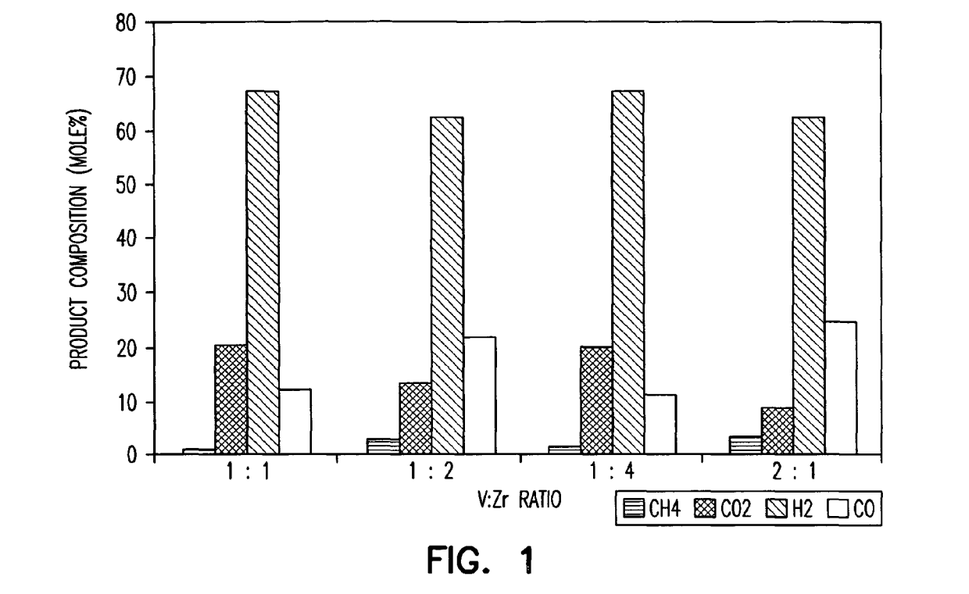
FIG. 1 depicts a plot of steam reforming reaction product composition in which a 10% $Ni-VO_n-ZrO_2/Al_2O_3$ catalyst of the instant invention is used during reforming (Results are shown for 4 values of the V:Zr ratio of the alkoxide impregnation solutions used in preparing the catalyst).

The steam reforming yield of hydrogen obtained by use of these preferred catalysts remained at approximately 70% by volume notwithstanding variation of V:Zr molar ratios, the weight percentage of Ni, and the use of a steam to carbon ratio in the range 2-3:1. However, as shown in FIG. 1, it was observed that a catalyst prepared with an impregnation solution having a V:Zr mole ratio of 1:4 yielded a $CO/CO_2$ ratio of approximately 0.6, whereas a catalyst prepared with an impregnation solution having a V:Zr mole ratio of 1:2 yielded a $CO/CO_2$ ratio of 1.4 and a catalyst prepared with an impregnation solution having a V:Zr mole ratio of 2:1 yielded a $CO/CO_2$ ratio of 1.6. Without any intent to be bound by theory or to otherwise limit the scope of the instant invention, it is believed that $ZrO_2$ acts as a spacer between $VO_n$ formula units in the monolayer with the result that larger amounts of $ZrO_2$ stabilize $VO_n$. The presence of a relatively large amount of $ZrO_2$ interspersed with $VO_n$ may lower the mobility of the vanadium oxide formula units and lead to a more stable dispersion with a higher fraction of active surface sites.

Variation of the deposition sequence of the oxides of V and Zr onto the alumina confirmed the importance of the mixed monolayer dispersion of $V_2O_5$ and $ZrO_2$. In one experiment, a $ZrO_2$ layer was deposited onto an alumina support followed by deposition of a $V_2O_5$ layer (prepared with an impregnation solution having V:Zr ratio of 1:1). However, this catalyst, although initially active, deactivated quite rapidly.

Using a catalyst prepared with an impregnation solution having a V:Zr ratio of 1:2 prepared from zirconium n-butoxide in place of zirconium isopropoxide resulted in a steam reforming product composition having a lower ratio of $CO/CO_2$. Both of these catalysts, however, resulted in reforming $H_2$ yields in excess of 65%. Other zirconium alkoxides such as ethoxide or t-butoxide could be used in the preparation of the mixed oxide film.

Figure 3:
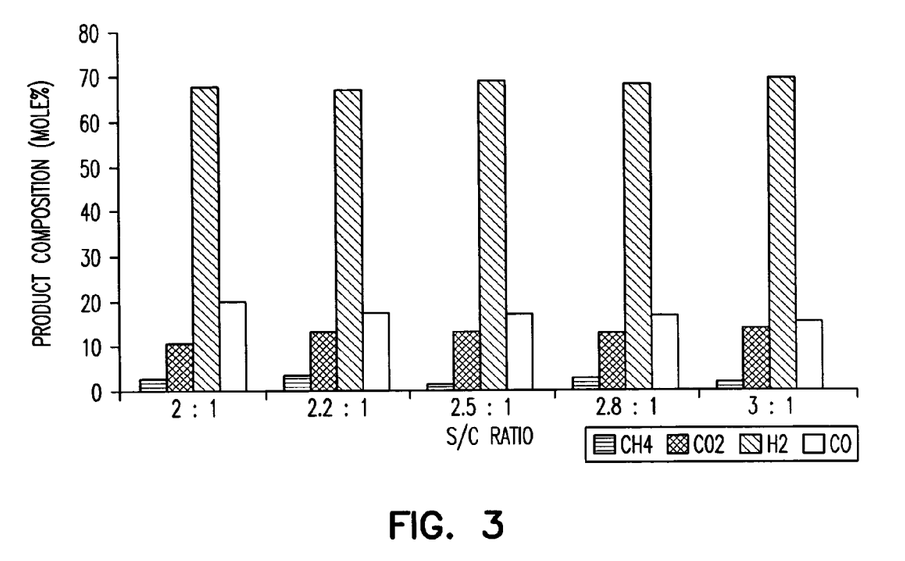
FIG. 3 depicts a plot of steam reforming reaction product composition relative to water to carbon (or steam to carbon) ratio using a 10% $Ni-VO_n-ZrO_2/Al_2O_3$ catalyst of the instant invention during reforming (V:Zr impregnation solution ratio in the catalyst equals 1:4).

The water to carbon, or steam to carbon, ratio during steam reforming was also varied to assess performance of the catalysts. Although the standard water to carbon ratio of reactants for steam reforming reaction used was 3.0, a lower ratio is desired. Theoretically, the stoichiometric ratio of water to carbon for the steam reforming of octane to produce $H_2$ and CO is 1.0. It would be expected that higher amounts of water should increase the formation of $CO_2$ and thus reduce the amount of CO in the product. Experiments on steam reforming reactions using a $Ni—V_2O_5—ZrO_2/Al_2O_3$ catalyst (prepared with an impregnation solution having V:Zr mole ratio=1:4; Zr from zirconium n-butoxide) with variation of water to carbon ratio from 3:1 to 2:1 were conducted. Plots of the average product composition as a function of water to carbon ratio are displayed in FIG. 3. In contrast to observations at low space velocity where the product composition is not affected by the change of water to carbon ratio between 3:1 and 2:1, with increasing fuel space velocity there is a gradual increase in the $CO/CO_2$ ratio.

Figure 4:
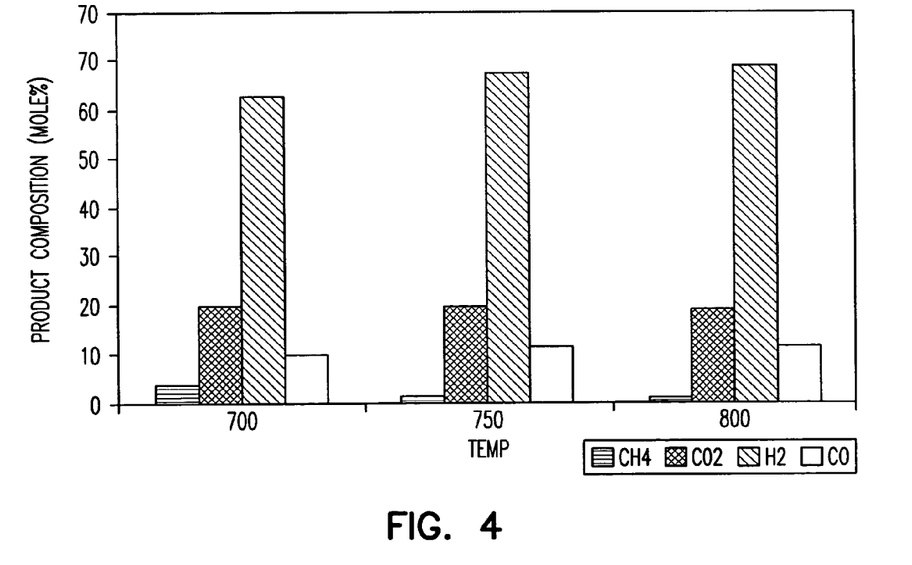
FIG. 4 depicts a plot of steam reforming reaction product composition as a function of reactor wall temperature using a 10% $Ni-VO_n-ZrO_2/Al_2O_3$ catalyst of the instant invention (V:Zr impregnation solution ratio in the catalyst equals 1:4, steam to carbon ratio is 3:1).

Variations in reactor fuel-space velocity indicate that there are preferred catalyst configurations in packed bed reactors employing the catalysts of the instant invention. Slow heat transfer to and from the reactor bed and a large pressure drop across the bed were not problematic at a low fuel space velocity (e.g., 2.5 g fuel/g cat.hr or less). However, with a typical catalyst bed configuration (3 g catalyst forming 11.5 cm packed-bed contained in a 0.75 cm ID quartz column), reactions at a fuel space velocity of 18 g/g cat.hr created a large temperature gradient between the reactor wall and the bed center. This large temperature gradient, which was sometimes as high as 100° C., was due to the large amount of heat taken by the endothermic steam reforming reaction. At oven set-temperatures of 750° C., the front end of the bed was found to be as low as 450° C. while the reactor wall temperature was around 550° C. As indicated by the data in FIG. 4, there is a slight rise in the amount of hydrogen production going from 700° C. to 800° C. but the $CO/CO_2$ ratio is not influenced. Methane production decreases with increasing temperature.

Very good performance was observed using a catalyst bed configuration that employed a mixture of catalyst and silicon carbide in a 1:2 volume ratio. With this reactor configuration, during steam reforming at fuel space velocities as high as 18 grams of fuel/g cat.hr, the temperature difference between reactor wall and the center of the bed can be as low as 10° C.

Catalyst threshold limits in the operation using the packed-bed reactor system of the instant invention were also determined. Experiments to determine the threshold limit of the catalyst show that the $Ni—V_2O_5—ZrO_2/Al_2O_3$ (V:Zr mole ratio=1:4; Zr obtained from zirconium n-butoxide) catalyst formulation can undergo steam reforming reaction at fuel space velocity of 80 g/g cat.hr at water to carbon ratio of 2.5 resulting in 100% fuel conversion without any formation of higher hydrocarbons or coke. It was observed also that the reactions at these space velocities gave a product selectivity of around 70% $H_2$ and a $CO/CO_2$ ratio of no greater than 1.5. This $CO/CO_2$ ratio suggests that the catalyst is also enhancing the high temperature water gas shift reaction. While the $H_2$ production is unchanged at high space velocities, the $CO/CO_2$ ratio is significantly increased. Furthermore, the catalyst was able to perform well in cold-start operations involving using the catalyst for reaction at high fuel space velocities immediately after the reactor reached operating temperature. The fuel space velocities obtained thus far indicate that the catalyst threshold limit has not been reached.

The invention is further described in the following examples, which are illustrative and not limiting. All percentages are weight percentages, unless otherwise specified.

EXAMPLE 1

Preparation of Catalyst Support Phase

Alumina from Norton Chemical Company was supplied as spherically-shaped granules. These were either used as spherically-shaped granules or crushed and sieved to 40/60 mesh. Vanadium(V) isopropoxide (98%), and zirconium(IV)

isopropoxide isopropanol (99.9%) complex were purchased from Aldrich. These materials were kept in a nitrogen-filled atmosphere prior to use. Ruthenium(III) acetylacetonate, rhodium(III) acetylacetonate, palladium(II) acetylacetonate, platinum(II) acetylacetonate and nickel(II) nitrate were purchased from Strem. HPLC grade THF from Fisher Scientific was used after being dried over potassium by distillation. The gases hydrogen, nitrogen, helium, argon, and air, purchased from Air Products, were purified by in-line gas dryers and oxygen scavengers. Air was purified using in-line moisture scavengers.

The preparation of the oxide support involved reaction of the metal oxide monolayer precursors, metal alkoxides, with the surface hydroxyl groups of the supporting oxide under controlled conditions in order to achieve monolayer dispersions. The alumina was dried at 110° C. to remove any physisorbed water, leaving the surface hydroxylated. In a typical preparation of the $V_2O_5$—$ZrO_2/Al_2O_3$ catalyst support, vanadium isopropoxide and zirconium isopropoxide, taken in a 1:1 mole ratio and the amount required to react with all the surface hydroxyl groups, were dissolved in 15 mL of dry THF. The alkoxide solution was heated to boiling and kept under reflux for 1 hour. Then the alumina was impregnated with the hot alkoxide solution and heating was continued for 24 hours. The excess solvent along with small amounts of unreacted alkoxides was removed followed by washing with THF. The remaining solid residue was slowly hydrolyzed by passing water vapor in a nitrogen carrier for 24 hours at 80° C. At the end of the hydrolysis period the material was calcined at 500° C. to yield the final support. Other supports prepared using other zirconium alkoxides were prepared in the same manner.

EXAMPLE 2

Preparation of Catalyst Precursors

To prepare around 22 g of Ni—$V_2O_5$—$ZrO_2/Al_2O_3$ catalyst precursor containing 10% Ni, 9.91 g of $NiNO_3 \cdot 6H_2O$ is dissolved in THF and acidified with $HNO_3$ (pH=0.2 to 0.4) and stirred overnight. To this is added 20 g of $V_2O_5$—$ZrO_2/Al_2O_3$ that has been treated in vacuum overnight at 110° C. After stirring for 24 hours, the solvent is removed by evaporation in air. It is then dried in an oven at 110° C. for 4 hours and then calcined at 600° C.

For catalysts comprised of Pd, Pt or Rh alone, at least around 1% by weight of such transition metals should typically be used. For catalysts containing Ni in combination with other transition metals, mixtures of 10% elemental Ni with at least 1% of one or more of the other elemental transition metals should be preferred. For 1 g of $V_2O_5$—$ZrO_2/Al_2O_3$ catalyst containing 1% Pt, around 0.021 g of platinum(III) acetylacetonate precursor is dissolved in 8 mL of THF and acidified with $HNO_3$ (pH=0.2 to 0.4) and stirred overnight. It is then dried in an oven at 110° C. for 4 hours and then calcined at 600° C.

EXAMPLE 3

Catalyst Screening (a) Ni—$V_2O_5$—$ZrO_2/Al_2O_3$ Catalysts

In this and the following examples, all catalysts tested or described were, or would be, in the form of 40-60 mesh particles unless otherwise noted. Reactant feed was controlled with mass flow controllers or syringe pumps. The product stream was analyzed using gas chromatography.

Ni—$V_2O_5$—$ZrO_2/Al_2O_3$ catalysts, prepared from catalyst precursors and characterized as described in Examples 1 and 2 were screened by measuring catalytic activities using an integral packed bed reactor. The catalyst support alumina was also tested as were compositions containing only one of Ni, Pd, Pt, Ru or Rh supported on alumina. While these were catalytically active initially, they deactivated quickly during testing. Similarly, catalyst compositions comprising an elemental transition group metal, e.g., Ni, Pd, Pt, Ru or Rh supported on inert supports such as alumina were tested and were catalytically active initially, but soon deactivated. Samples containing the oxides of vanadium and zirconium supported on alumina exhibited high hydrogen generation catalytic activity when contacted with hydrocarbons and steam but also rapidly deactivated. 10% Ni—$V_2O_5$—$ZrO_2/Al_2O_3$ (Ni is elemental Ni) catalysts displayed the highest activity and the greatest stability with time.

(b) Catalytic Activity (Nickel-Containing Catalysts)

Ni—$V_2O_5$—$ZrO_2/Al_2O_3$ catalysts of the instant invention were calcined for 5 hours and reduced for 12 hours at 600° C. prior to reaction. They showed a remarkable reactivity and longevity. In a typical steam reforming run using such compositions comprising 10% elemental Ni at 750° C., a steam to carbon ratio of 2.5 and 0.375 g of catalyst, the following product composition at a time on stream of 100 hours was obtained (mole percent): $H_2$=70%, CO=15%, $CO_2$=10% and $CH_4$=3%. No significant loss in activity was observed after 200 hours of operation and no carbon deposition occurred on the catalyst particles. The only reaction products generated throughout the run were $H_2$, $CO_2$, CO and $CH_4$; no higher hydrocarbons were generated. Repeated studies indicate that a combination of all three components, namely, the transition group metal and the oxides of vanadium and zirconium are essential for high catalytic activity.

EXAMPLE 4

Catalysts with Other Metals

Catalysts containing 1% Pd, Pt, Ru, and Rh, supported on $V_2O_5$—$ZrO_2/Al_2O_3$ were also studied. Their oxides, generated by calcining the impregnated precursors, are all easily reducible (typically done at 350° C. for ten hours under hydrogen flow). When these metals are supported on alumina (without the presence of the oxides of vanadium and zirconium) the catalysts exhibit high initial activity and selectivity toward $H_2$ in steam reforming of isooctane, but generally deactivated quickly due to formation of coke on their surface. Increasing the amount of such transition metals to 10% by weight should yield catalysts with a prolonged activity just as was observed when nickel content was increased from 1% to 10%.

EXAMPLE 5

Catalysts with $TiO_2$ as the Redox Inactive Metal Oxide Component

A catalyst prepared using titania, $TiO_2$, in place of $ZrO_2$, Ni(10%)-$V_2O_5$—$TiO_2/Al_2O_3$, was tested using both isooctane and methane as fuels. With isooctane a space velocity threshold limit of 52 g/g cat.hr was observed at an oven set temperature of 775° C. and a reactor skin temperature of 715°

C. With methane a threshold of 26 g/g cat.hr was observed at an oven set temperature of 775° C. and a reactor skin temperature of 715° C.

EXAMPLE 6

Catalyst With a Lanthanide Oxide as the Redox-Active Metal Oxide: Ni(10%)—$CeO_2$—$ZrO_2/Al_2O_3$ A catalyst prepared using ceria, $CeO_2$, in place of $V_2O_5$, Ni (10%)-$CeO_2$—$ZrO_2/Al_2O_3$, was tested using isooctane as fuel. A space velocity threshold limit of 43 g/gcat.hr was observed at an oven set temperature of 750° C. and a reactor skin temperature of 715° C.

EXAMPLE 7

Catalyst Test with California Fuel

The Ni(10%)-$V_2O_5$—$ZrO_2/Al_2O_3$ (40-60 mesh) catalyst was tested using the California fuel. This fuel contains a blend of 26.3% aromatic compounds, 5.9% olefins, 67.8% saturates, and also 33 ppm of sulfur. The catalyst was able to convert the fuel entirely to $H_2$, CO, $CO_2$, and $CH_4$ at an oven set temperature of 750° C. During 5 days of operation, there was no catalyst deactivation, coke formation was not detected, and high $H_2$ selectivity and a ratio of $CO_2/CO$ of greater than 1 was achieved. A typical composition of the product reformate (product of the steam reforming reaction) (on $H_2O$ and $N_2$-free basis) comprised $H_2$ (66.2%) ;CO (8.4%) ;$CO_2$ (25.2%) and $CH_4$ (0.2%).

EXAMPLE 8

Ru Catalysts

Ru—$V_2O_5$—$ZrO_2/Al_2O_3$ catalysts of the instant invention were calcined for around 5 hours and reduced at 12 hours at around 600° C. prior to reaction. In a typical steam reforming run using such compositions comprising 5% by weight elemental Ru at 750° C. a steam to carbon ratio of 2.5 and 0.375 g of catalyst, the following product composition was obtained (mole percent): $H_2$=66%, CO=11%, $CO_2$=15% and $CH_4$=8%. The maximum space velocity attained without appearance of more than 2% $C_2$ or $C_3$ was 24 g fuel/g cat.hr.

EXAMPLE 9

Demonstration of Redox Activity of the Metal Oxide Monolayer

A Ni—$V_2O_5$—$ZrO_2/Al_2O_3$ catalyst, comprised of vanadium in an initial (V) oxidation state, after reduction in a hydrogen stream to produce $V_2O_3$ (black), was observed to react with water vapor to generate a blue colored material consistent with the color of $VO_2$. This observation is evidence for the water oxidation of V(III),to V(IV) in the solid state. The redox activity of the vanadium component of this catalyst is established by this observation. A X-ray photoelectron spectroscopy study of a used sample of the catalyst established the presence of vanadium in oxidation states V, IV, and III.

What is claimed is:

1. A catalyst precursor comprising a support phase impregnated with one or more elemental transition metals, wherein:
   (a) the support phase is formed by dispersion of a monolayer on the surface of a high surface area alumina support; and
   (b) the monolayer comprises $XO_n$:$YO_2$, where (1) $XO_n$ is a redox active metal oxide and n is either 1.5, 2, 2.5, or 3 depending on the oxidation number of X, and (2) $YO_2$ is a redox inactive metal oxide.

2. The catalyst precursor of claim 1 of the formula M-$XO_n$—$YO_2/Al_2O_3$, wherein:
   (a) M is an elemental reduced transition metal or mixture of elemental reduced transition metals selected from the group consisting of Ni, Pd, Pt, Rh, and Ru;
   (b) $XO_n$ is either $Mn_2O_3$, $V_2O_5$, or $CeO_2$; and
   (c) $YO_2$ is either $TiO_2$ or $ZrO_2$.

3. The catalyst precursor of claim 2, wherein the molar ratio of $XO_n$:$YO_2$ ranges from about 2:1 to about 1:15.

4. The catalyst precursor of claim 3, wherein $XO_n$ is $V_2O_5$, $YO_2$ is $ZrO_2$, M is Ni, the molar ratio of $XO_n$—$YO_2$ is from about 2:1 to about 1:4, and the $ZrO_2$ is derived from zirconium isopropoxide or zirconium n-butoxide.

5. The catalyst precursor of claim 2 of the formula M-$V_2O_5$—$ZrO_2/Al_2O_3$ wherein M is Ni.

6. The catalyst precursor of claim 2 of the formula M-$V_2O_5$—$ZrO_2/Al_2O_3$, wherein M is a mixture of Ni and one or more other transition metals.

7. The catalyst precursor of claim 6, wherein the other transition metals include one or more of Pt, Pd, Rh and Ru.

8. The catalyst precursor of claim 2 of the formula Ru—$V_2O_5$—$ZrO_2/Al_2O_3$.

9. The catalyst precursor of claim 8, wherein the weight percentage of Ru is about 5% or greater.

10. The catalyst precursor of claim 4, wherein $ZrO_2$ is derived from zirconium n-butoxide and the molar ratio of V:Zr is from about 1:2 to about 1:3.

11. The catalyst precursor of claim 7, wherein the weight percentage of Pt, Pd, Rh, or Ru is about 1%.

12. The catalyst precursor of claim 2 of the formula Ni—$V_2O_5$—$TiO_2/Al_2O_3$ wherein the weight percentage of Ni is between about 5% to 15% by weight.

13. The catalyst precursor of claim 2 of the formula Ni—$Mn_2O_3$—$ZrO_2/Al_2O_3$ wherein the weight percentage of Ni is between about 5% to 15% by weight.

14. The catalytic precursors of claim 12, wherein the weight percentage of Ni is about 5%.

15. The catalyst precursor of claim 2 of the formula Ni—$CeO_2 TiO_2/Al_2O_3$ wherein the weight percentage of Ni is between about 5% to 15% by weight.

16. The catalyst precursor of claim 2 of the formula Ni—$CeO_2$—$ZrO_2/Al_2O_3$ wherein the weight percentage of Ni is between about 5% to 15% by weight.

17. The catalyst precursor of claim 2 of the formula Ni—$MoO_3$—$ZrO_2/Al_2O_3$ wherein the weight percentage of Ni is between about 5% to 15% by weight.

18. The catalyst precursor of claim 2 of the formula Ni—$MoO_3$—$TiO_2/Al_2O_3$ wherein the weight percentage of Ni is between about 5% to 15% by weight.

19. The catalyst precursor of claim 2 of the formula Ni—$V_2O_5$—$ZrO_2/Al_2O_3$, wherein the weight percentage of Ni is about 10%, the molar ratio of V to Zr in the precursor is about 1:4, and the $ZrO_2$ is derived from zirconium n-butoxide or zirconium i-propoxide.

20. The catalyst precursor of claim 2 of the formula Ni—$V_2O_5$—$ZrO_2/Al_2O_3$, wherein the weight percentage of Ni is about 10% and the $ZrO_2$ is derived from zirconium n-butoxide.

21. The catalyst precursor of claim 1, wherein $XO_n$ is a redox active oxide of a lanthanide.

22. A catalyst formed by the reduction of a catalyst precursor of claims 1, 2, 3, 4, 5, 6, 7, 8, 9, 10, 11, 12, 13, 14, 15, 16, 17, 18, 19, 20, or 21 wherein the catalyst is sulfur tolerant.

23. The catalyst of claim 22, wherein the catalyst is formed in situ in a reactor by reducing the catalyst precursor through contact with a hydrocarbon feed in the reactor.

24. The catalyst of claim 22, wherein the catalyst is formed by reducing the catalyst precursor through contact with a hydrogen gas-rich stream at a temperature of between about 300° C. to about 600° C.

25. The catalyst of claim 22, wherein the catalyst is formed by reducing the catalyst precursor through contact with a helium gas-rich stream at a temperature of between about 400° C. to about 800° C.

26. The catalyst of claim 22, wherein the catalyst is formed by reducing the catalyst precursor through contact with a CO gas-rich stream at a temperature of between about 400° C. to about 800° C.

27. A method of making a catalyst precursor comprising impregnating a support phase with one or more elemental transition metals, wherein:
   (a) the support phase is formed by dispersion of a monolayer on the surface of a high surface area alumina support; and
   (b) the monolayer comprises $XO_nYO_2$, where (1) $XO_n$ is a redox active metal oxide and n is either 1.5, 2, 2.5, or 3 depending on the oxidation number of X, and (2) $YO_2$ is a redox inactive metal oxide.

28. The method of claim 27, wherein the catalyst precursor has the formula $M$-$XO_n$—$YO_2/Al_2O_3$, and wherein:
   (a) M is an elemental reduced transition metal or mixture of elemental transition metals selected from the group consisting of Ni, Pd, Pt, Rh, and Ru;
   (b) $XO_n$ is selected from the group consisting of $Mn_2O_3$, $V_2O_5$, and $CeO_2$; and
   (c) $YO_2$ is selected from the group consisting of $TiO_2$ and $ZrO_2$.

29. The method of claim 28, wherein the molar ratio of $XO_n$—$YO_2$ is controlled using impregnation solutions with ranges from about 2:1 to about 1:15.

30. The method of claim 29, wherein $XO_n$ is $V_2O_5$, $YO_2$ is $ZrO_2$ M is Ni, the molar ratio of $XO_n$—$YO_2$ is controlled using impregnation solutions with ranges from about 2:1 to about 1:4, and the $ZrO_2$ is derived from zirconium isopropoxide or zirconium n-butoxide.

31. The method of claim 28, wherein the catalyst precursor has the formula M -$V_2O_5$—$ZrO_2/Al_2O_3$ and wherein M is Ni.

32. The method of claim 28, wherein the catalyst precursor has the formula M -$V_2O_5$—$ZrO_2/Al_2O_3$ and wherein M is a mixture of Ni and one or more other transition metals.

33. The method of claim 32, wherein the other transition metals are selected from the group consisting of Pt, Pd, Rh and Ru.

34. The method of claim 28, wherein the catalyst precursor has the formula Ru—$V_2O_5$—$ZrO_2/Al_2O_3$.

35. The method of claim 34, wherein the weight percentage of Ru is about 5% or greater.

36. The method of claim 30, wherein $ZrO_2$ is derived from a zirconium n-butoxide.

37. The method of claim 33, wherein the weight percentage of Pt, Pd, Rh, or Ru is about 1%.

38. The method of claim 28, wherein the catalyst precursor has the formula Ni—$V_2O_5$—$TiO_2/Al_2O_3$ and wherein the weight percentage of Ni is between about 5% to 15% by weight.

39. The method of claim 28, wherein the catalyst precursor has the formula Ni—$Mn_2O_3$—$ZrO_2/Al_2O_3$ and wherein the weight percentage of Ni is between about 5% to 15% by weight.

40. The method of claim 38, wherein the weight percentage of Ni is about 5%.

41. The method of claim 28, wherein the catalyst precursor has the formula Ni—$CeO_2$—$TiO_2/Al_2O_3$ and wherein the weight percentage of Ni is between about 5% to 15% by weight.

42. The method of claim 28, wherein the catalyst precursor has the formula Ni—$CeO_2$—$ZrO_2/Al_2O_3$ and wherein the weight percentage of Ni is between about 5% to 15% by weight.

43. The method of claim 28, wherein the catalyst precursor has the formula Ni—$MoO_3$—$ZrO_2/Al_2O_3$ and wherein the weight percentage of Ni is between about 5% to 15% by weight.

44. The method of claim 28, wherein the catalyst precursor has the formula Ni—$MoO_3$—$TiO_2/Al_2O_3$ and wherein the weight percentage of Ni is between about 5% to 15% by weight.

45. The method of claim 28, wherein the catalyst precursor has the formula Ni—$V_2O_5$—$ZrO_2/Al_2O_3$ and wherein the weight percentage of Ni is about 10%, the molar ratio of V to Zr is from about 1:2 to about 1:3, and the $ZrO_2$ is derived from zirconium n-butoxide or zirconium i-propoxide.

46. The method of claim 28, wherein the catalyst precursor has the formula Ni—$V_2O_5$—$ZrO_2/Al_2O_3$ and wherein the weight percentage of Ni is about 10% and the $ZrO_2$ is derived from zirconium n-butoxide.

47. A method of making a catalyst comprising reducing a catalyst precursor, wherein the catalyst precursor comprises a support phase impregnated with one or more elemental transition metals, and wherein:
   (a) the support phase is formed by dispersion of a monolayer on the surface of a high surface area alumina support; and
   (b) the monolayer comprises $XO_nYO_2$, where (1) $XO_n$ is a redox active metal oxide and n is either 1.5, 2, 2.5, or 3 depending on the oxidation number of X, and (2) $YO_2$ is a redox inactive metal oxide.

48. The method of claim 47, wherein the catalyst precursor has the formula $M$-$XO_n$—$YO_2/Al_2O_3$, and wherein:
   (a) M is an elemental reduced transition metal or mixture of elemental reduced transition metals selected from the group consisting of Ni, Pd, Pt, Rh, and Ru;
   (b) $XO_n$ is selected from the group consisting of $Mn_2O_3$, $V_2O_5$, and $CeO_2$; and
   (c) $YO_2$ is selected from the group consisting of $TiO_2$ and $ZrO_2$.

49. The method of claim 48, wherein the molar ratio of $XO_n$—$YO_2$ is controlled using impregnation solutions with ranges from about 2:1 to about 1:15.

50. The method of claim 48, wherein $XO_n$ is $V_2O_5$, $YO_2$ is $ZrO_2$, M is Ni, the molar ratio of $XO_n$—$YO_2$ is controlled using impregnation solutions with ranges from about 2:1 to about 1:4, and the $ZrO_2$ is derived from zirconium isopropoxide or zirconium n-butoxide.

51. The method of claim 47, wherein the catalyst precursor has the formula M -$V_2O_5$—$ZrO_2/Al_2O_3$ and wherein M is Ni.

52. The method of claim 47, wherein the catalyst precursor has the formula M -$V_2O_5$—$ZrO_2/Al_2O_3$ and wherein M is a mixture of Ni and one or more other transition metals.

53. The method of claim 52, wherein the other transition metals are selected from the group consisting of Pt, Pd, Rh and Ru.

54. The method of claim 47, wherein the catalyst precursor has the formula Ru—$V_2O_5$—$ZrO_2/Al_2O_3$.

55. The method of claim 54, wherein the weight percentage of Ru is about 5% or greater.

56. The method of claim 50, wherein $ZrO_2$ is derived from zirconium n-butoxide or zirconium i-propoxide.

57. The method of claim 53, wherein the weight percentage of Pt, Pd, Rh, or Ru is about 1%.

58. The method of claim 47, wherein the catalyst precursor has the formula $Ni—V_2O_5—TiO_2/Al_2O_3$ and wherein the weight percentage of Ni is between about 5% to 15% by weight.

59. The method of claim 47, wherein the catalyst precursor has the formula $Ni—Mn_2O_3—ZrO_2/Al_2O_3$ and wherein the weight percentage of Ni is between about 5% to 15% by weight.

60. The method of claim 47, wherein the weight percentage of Ni is about 5%.

61. The method of claim 47, wherein the catalyst precursor has the formula $Ni—CeO_2—TiO_2/Al_2O_3$ and wherein the weight percentage of Ni is between about 5% to 15% by weight.

62. The method of claim 47, wherein the catalyst precursor has the formula $Ni—CeO_2—ZrO_2/Al_2O_3$ and wherein the weight percentage of Ni is between about 5% to 15% by weight.

63. The method of claim 47, wherein the catalyst precursor has the formula $Ni—MoO_3—ZrO_2/Al_2O_3$ and wherein the weight percentage of Ni is between about 5% to 15% by weight.

64. The method of claim 47, wherein the catalyst precursor has the formula $Ni—MoO_3—TiO_2/Al_2O_3$ and wherein the weight percentage of Ni is between about 5% to 15% by weight.

65. The method of claim 47, wherein the catalyst precursor has the formula $Ni—V_2O_5—ZrO_2/Al_2O_3$ and wherein the weight percentage of Ni is around 10%, the molar ratio of V to Zr is from about 1:2 to about 1:3, and the $ZrO_2$ is derived from zirconium n-butoxide or zirconium i-propoxide.

66. The method of claim 47, wherein the catalyst precursor has the formula $Ni—V_2O_5—ZrO_2/Al_2O_3$ and wherein the weight percentage of Ni is about 10% and the $ZrO_2$ is derived from zirconium n-butoxide.

67. The method of claim 46, 47, 48, 49, 50, 51, 52, 53, 54, 55, 56, 57, 58, 59, 60, 61, 62, 63, 64, 65, or 66, wherein the catalytic precursor is reduced in situ in a reactor through contact with a hydrocarbon feed in the reactor.

68. The method of claim 46, 47, 48, 49, 50, 51, 52, 53, 54, 55, 56, 57, 58, 59, 60, 61, 62, 63, 64, 65, or 66, wherein the catalytic precursor is reduced through contact with a hydrogen gas-rich stream at a temperature of between about 300° C. to about 600° C.

69. The method of claim 46, 47, 48, 49, 50, 51, 52, 53, 54, 55, 56, 57, 58, 59, 60, 61, 62, 63, 64, 65, or 66, wherein the catalytic precursor is reduced through contact with a helium gas-rich stream at a temperature of between about 400° C. to about 800° C.

70. The method of claim 46, 47, 48, 49, 50, 51, 52, 53, 54, 55, 56, 57, 58, 59, 60, 61, 62, 63, 64, 65, or 66, wherein the catalytic precursor is reduced through contact with a CO gas-rich stream at a temperature of between about 400° C. to about 800° C.

71. A process for producing a hydrogen-rich product from a hydrocarbon feed using a catalyst of claim 22, wherein the feed is reacted with steam in the presence of the catalyst.

72. The process of claim 71, wherein the hydrocarbon feed is reacted with steam in the presence of the catalyst at a temperature in the range of from about 300° C. to about 1,000° C., a total pressure of approximately two atmospheres or more, and a molar ratio of steam to carbon in the hydrocarbon feed of approximately 1:1 to approximately 3:1.

73. The process of claim 71, wherein the hydrocarbon feed contains at least 20 ppm of a sulfur species.

74. The process of claim 72 or 73, wherein the hydrocarbon feed is methane, propane, natural gas, liquefied petroleum gas, naphtha, gasoline, kerosene, jet fuel, diesel or mixtures of these.

75. The process of claim 74, wherein the hydrogen-rich product comprises approximately 60% to approximately 80% hydrogen on a volumetric basis.

76. The process of claim 68, wherein the hydrogen-rich product comprises carbon monoxide and carbon dioxide in a molar ratio of carbon monoxide to carbon dioxide of less than approximately 2.

77. A process for producing a hydrogen-rich product from a hydrocarbon feed using a catalyst of claim 22, comprising:
(a) providing the hydrocarbon feed to a reactor containing the catalyst packed bed configuration;
(b) contacting the hydrocarbon feed within the reactor with the catalyst; and
(c) introducing steam to the reactor in an amount and at a temperature such that the molar ratio of water to carbon in the fuel is maintained in the range of approximately 1:1 to approximately 3:1 throughout the catalyst bed and the temperature throughout the catalyst bed is maintained in the range of about 300° C. to about 1,000° C.

78. The process of claim 71 or 77, wherein the catalyst comprises a packed bed in a hydrogen production reactor.

79. The process of claim 78, wherein the fuel space velocity throughout the catalyst packed bed is up to 80 g fuel/g cat.hr.

80. A steam reforming process comprising reforming a hydrocarbon feedstock comprising about 5 ppm to about 100 ppm sulfur by reacting the hydrocarbon feedstock in a reactor with a catalyst of claim 22 in the presence of steam to yield a hydrogen-rich product which comprises approximately 60% to approximately 80% hydrogen on a volumetric basis and which has a molar ratio of $CO_2$ to CO of greater than one.

81. The steam reforming process of claim 80, wherein the molar ratio of steam to carbon in the hydrocarbon feedstock is between about 3:1 to about 2:1.

82. The steam reforming process of claim 81, wherein the steam reforming process temperature is between about 300° C. and 1,000° C.

83. The steam reforming process of claim 80, wherein the process yields the hydrogen-rich product under cold-start conditions.

84. The steam reforming process of claim 80, wherein the process yields sufficient hydrogen within approximately 30 seconds of reactor start-up to generate around 50 kW of fuel cell power.

85. The process of claim 83, wherein the hydrocarbon feedstock contains between about 10 ppm to about 100 ppm sulfur.

* * * * *

UNITED STATES PATENT AND TRADEMARK OFFICE
CERTIFICATE OF CORRECTION

PATENT NO.       : 7,771,702 B2
APPLICATION NO.  : 10/371188
DATED            : August 10, 2010
INVENTOR(S)      : Darrell P. Eyman and Christopher Brooks It is certified that error appears in the above-identified patent and that said Letters Patent is hereby corrected as shown below:

Column 14, claim 7, line 24, insert --selected from the group consisting-- between "more" and "of".

Column 15, claim 23, line 2, italicize the words "in situ".

Column 15, claim 24, line 7, delete the "." after "300° C.".

Column 15, claim 25, line 11, delete the "." after "400° C.".

Column 15, claim 26, line 14, delete the "." after "400° C.".

Column 17, claim 67, line 42, italicize the words "in situ".

Column 17, claim 68, line 47, delete the "." after "300° C.".

Column 17, claim 69, line 52, delete the "." after "400° C.".

Column 17, claim 70, line 57, delete the "." after "400° C.".

Column 18, claim 72, lines 3-4, delete the "." after "300° C." and "1,000° C.".

Column 18, claim 77, line 31, delete the "." after "300° C.".

Column 18, claim 82, lines 48-49, delete the "." after "300° C.".

Signed and Sealed this
Eighth Day of March, 2011

David J. Kappos
*Director of the United States Patent and Trademark Office*